July 23, 1968     F. L. HILL ET AL     3,393,752
ROTARY WEEDER
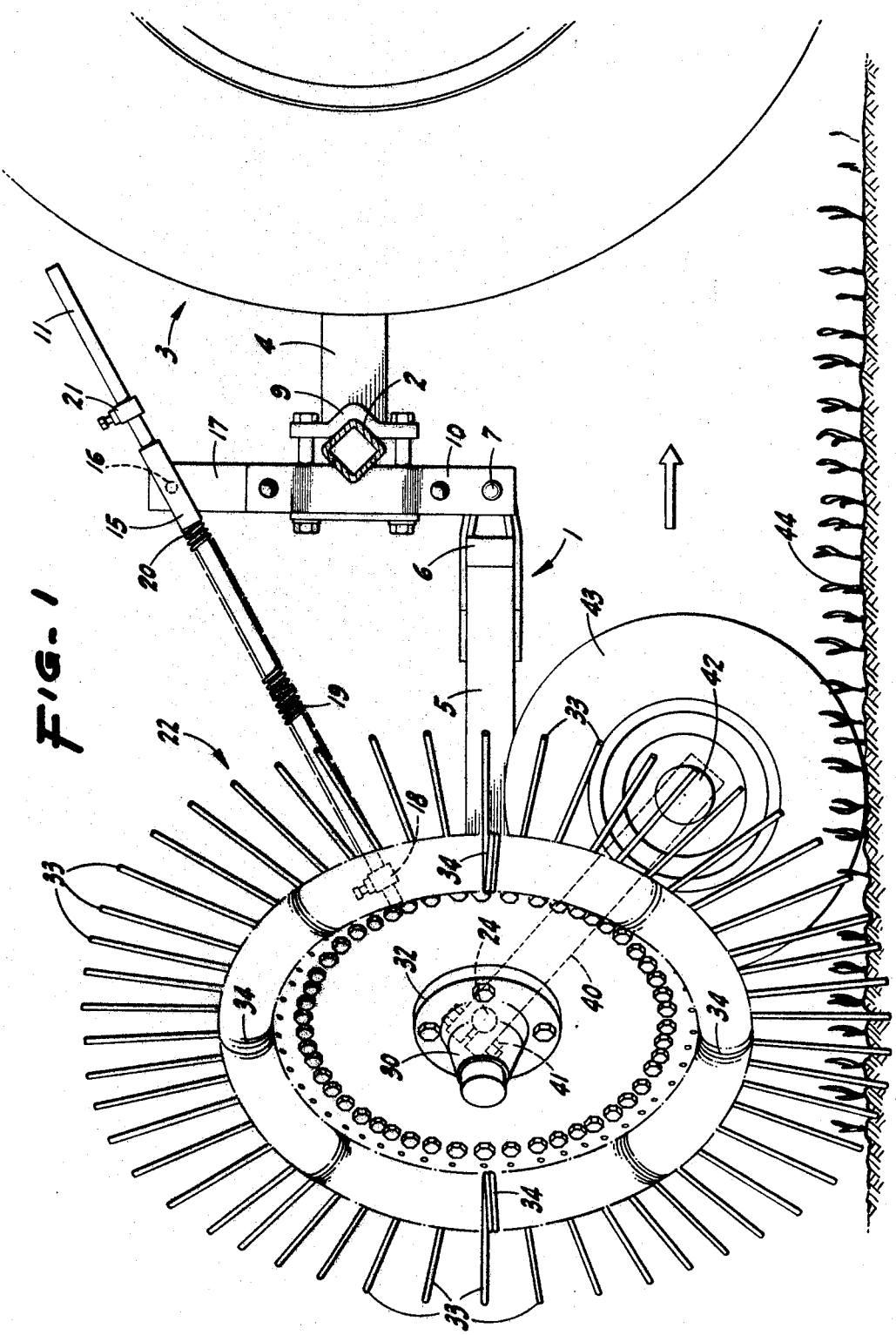

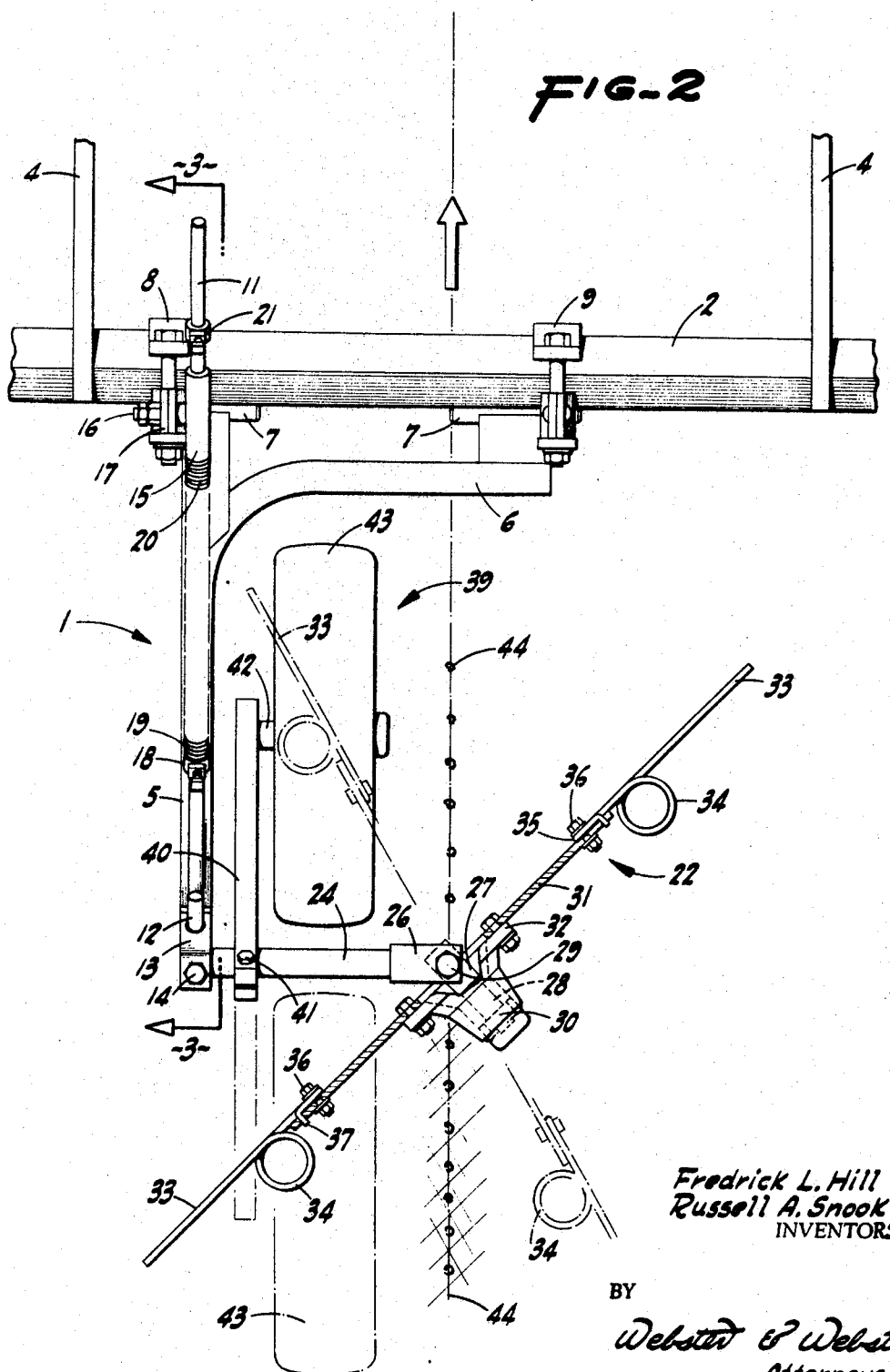

July 23, 1968  F. L. HILL ET AL  3,393,752
ROTARY WEEDER
Filed May 7, 1965  3 Sheets-Sheet 3
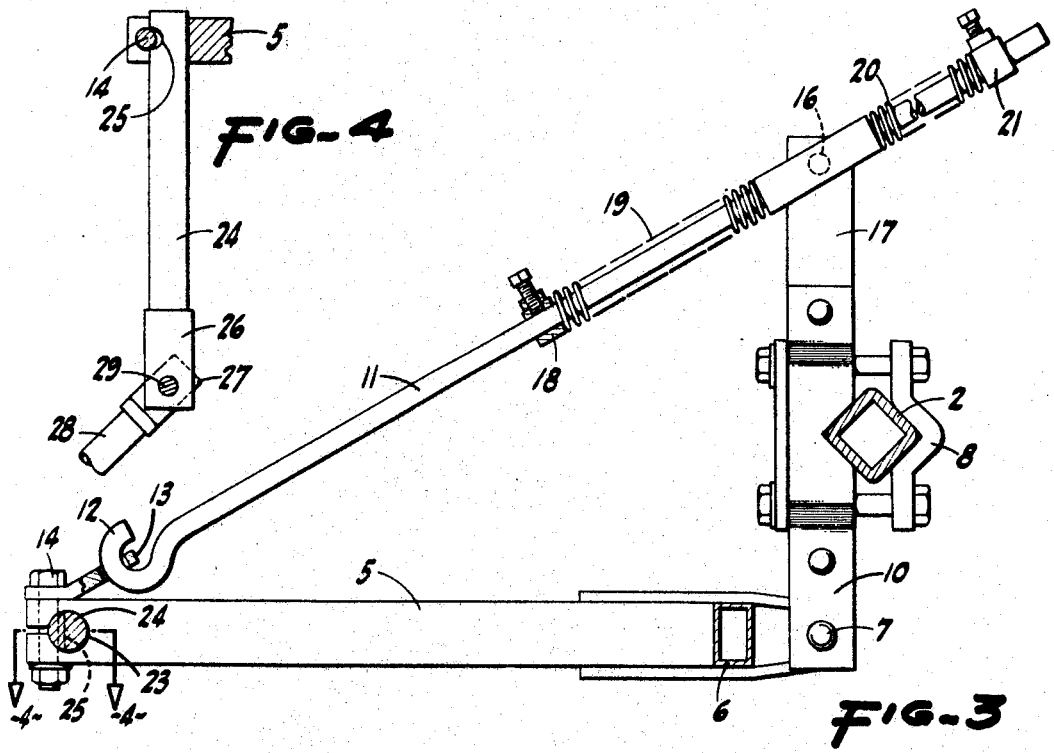
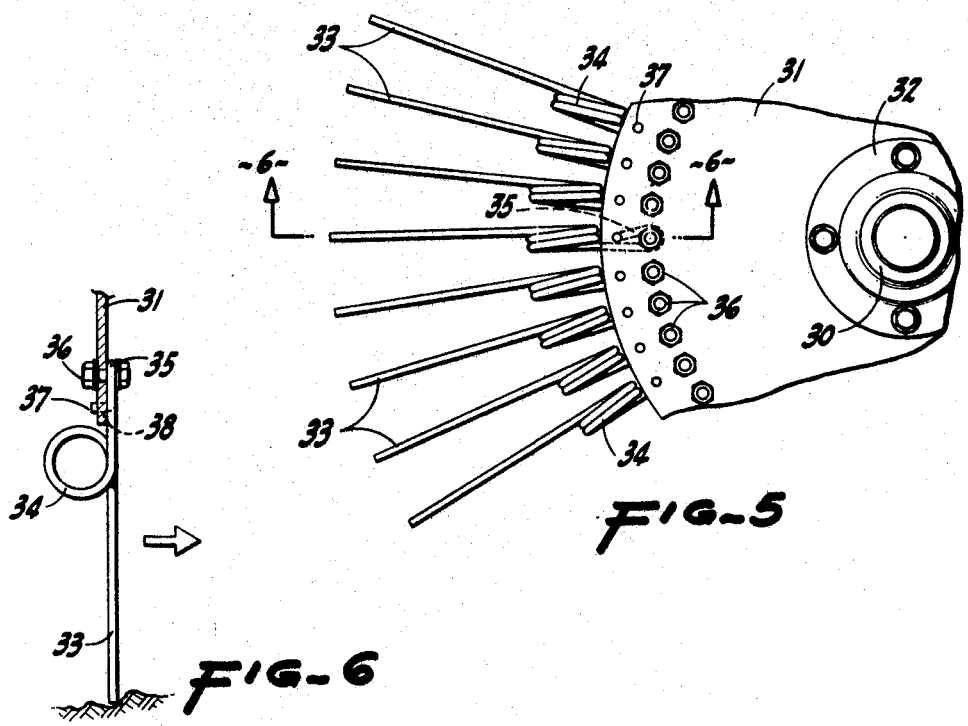

United States Patent Office 3,393,752
Patented July 23, 1968

3,393,752
ROTARY WEEDER
Frederick L. Hill and Russell A. Snook, Rio Vista, Calif., assignors to Blackwelder Manufacturing Company, Rio Vista, Calif., a corporation of California
Filed May 7, 1965, Ser. No. 454,129
2 Claims. (Cl. 172—527)

ABSTRACT OF THE DISCLOSURE

A crop-row weeding implement including a weeding rotor adapted to be mounted on a tractor in reversible diagonal relation to the crop row; there being a detachable ground-engaging gauge wheel adjustably mounted for cooperation with the weeding rotor irrespective of the reversed diagonal position thereof, and spring means arranged to exert, or control, a hold-down pressure on the weeding rotor.

---

In particular the invention is directed to, and it is a major object to provide, a ground driven rotary weeder—of novel construction—adapted for use in weeding crop rows; such implement being especially designed for, but not limited to, mounting on a tractor in draft relation.

Another object of the invention is to provide a rotary weeder, as above, which includes a draft structure, a weeding rotor which extends diagonally of the crop row, and novel means mounting such weeding rotor on said draft structure for ready and convenient adjustment, as well as reversal, of the diagonal angularity of said weeding rotor. The mounting means also provides for adjustment of the pitch of the weeding rotor in the direction of travel.

An additional object of the invention is to provide an implement, of the type described, wherein the weeding rotor is comprised of a wheel disc having a multiplicity of spring tines radiating from the periphery of said wheel disc; there being a novel connection between said disc and tines which permits easy removal and replacement of the latter.

It is also an object to provide an implement, of the type described, which is arranged in a manner such that—selectively and with a minimum of rearrangement of parts—the weeding rotor can be depth controlled by a gauge wheel, or set to float in spring balanced relation to the crop row.

A further object of the invention is to provide a rotary weeder which is designed for ease and economy of manufacture, ready installation in connection with a tool bar, and convenience of use.

A still further object of the invention is to provide a practical, reliable, and durable rotary weeder and one which is exceedingly effective for the purpose for which it is designed.

These objects are accomplished by means of such structure and relative arrangement of parts as will fully appear by a perusal of the following specification and claims.

In the drawings:

FIG. 1 is a side elevation of the rotary weeder as tractor mounted and in use.

FIG. 2 is a top plan of the same; the weeding rotor and the gauge wheel being shown in one working position in full lines, and in a reversed working position in broken lines.

FIG. 3 is an enlarged fragmentary elevation of the draft structure; the view being taken substantially on line 3—3 of FIG. 2, but with the springs arranged in the manner of use thereof when the gauge wheel is omitted.

FIG. 4 is an enlarged fragmentary plan view, partly in section, showing the laterally projecting supporting shaft for the weeding rotor.

FIG. 5 is an enlarged fragmentary elevation of the weeding rotor.

FIG. 6 is an elevation of one of the spring tines; the view being taken substantially on line 6—6 of FIG. 5 but showing such spring tine as positioned when in ground engagement.

Referring now more particularly to the drawings and to the characters of reference marked thereon, the rotary weeder comprises a draft structure, indicated generally at 1, disposed rearwardly of the transverse tool bar 2 at the rear of a tractor, indicated generally at 3; such tool bar being fixed in connection with the transversely spaced arms 4 of the tractor hitch.

The draft structure 1 includes a longitudinal draft beam 5 provided adjacent its front end with an integral laterally projecting front bar 6; the front end of beam 5 and the corresponding portion of the bar 6 being fitted with alined, transversely extending trunnions 7. Clamps 8 and 9 are secured in spaced relation on the tool bar 2, and the trunnions 7 are journaled in connection with brackets depending from the related clamps; one of such brackets being indicated at 10.

With the draft structure 1 constructed and mounted as above described, such structure is not only connected in draft relation to the tool bar 2 but is capable of up and down swinging motion in a longitudinal vertical plane. Such swinging motion of the draft structure 1 is regulated by means of the following included mechanism:

A thrust rod 11 extends at a forward and upward incline from adjacent the rear end of the draft beam 5; such thrust rod 11 being formed at its rear or lower end with a hook 12 engaged in an eye 13 secured to said rear end of draft beam 5 by a bolt 14.

Adjacent but short of its upper end, the thrust rod 11 slidably extends through a guide sleeve 15 having a lateral pivot pin 16 which extends through a post 17 upstanding in rigid relation from the clamp 8.

A lower stop collar 18 is secured on the rod 11 some distance below the guide sleeve 15, and a pair of end-to-end compression springs surround such rod between the stop collar 18 and guide sleeve 15; the lower spring being indicated at 19, while the upper spring is indicated at 20. See FIGS. 1 and 2.

With the springs 19 and 20 thus mounted and under some compression, they yieldably urge the draft structure 1 downwardly about the alined trunnions 7 as an axis and for the purpose as will hereinafter appear.

Under certain working conditions, likewise hereinafter described, the upper spring 20 is removed from its position on the rod 11 below the guide sleeve 15 and is replaced on such rod above said sleeve and between the latter and an upper stop collar 21. See FIG. 4. With this arrangement of the parts, the lower stop collar 18 is adjusted upwardly to place the lower spring 19 under some compression, and the upper stop collar 21 is similarly but downwardly adjusted relative to the upper spring 20; the draft structure 1 then being yieldably spring balanced with respect to both upward and downward swinging motion.

A diagonally disposed weeding rotor, indicated generally at 22, is mounted in connection with the draft structure 1 as follows:

Close to its rear end the longitudinal draft beam 5 is formed with a transverse bore 23 which receives one end of a laterally projecting relatively short supporting shaft 24; such shaft extending in the same direction from the beam 5 as does the front bar 6. The beam 5 is split rearwardly from the bore 23 as shown; the bolt 14 passing through such split end portion of the beam to provide a clamp which normally but rotatably adjustably secures said shaft 24 in said bore 23. The part of the shaft 24 adjacent the bolt 14 is formed with a tangential notch 25 which partially receives the shank of said bolt 14. The purpose of this arrangement is to limit the extent of possible rotative adjustment of the shaft 24.

At its free end, the shaft 24 is formed with a substantially horizontally opening fork 26 which receives and encompasses a flat attachment head 27 on the inner end of a spindle 28. A substatnially vertical bolt 29 pivotally adjustably but normally clampingly secures the head 27 in the fork 26 whereby to maintain the spindle 28 in predetermined angular relation to the direction of travel.

The diagonally disposed weeding rotor 22 includes a hollow frusto-conical hub 30 journaled on the spindle 28 and with the vertical axis of the bolt 29 lying in substantially the plane of rotation of said weeding rotor 22. A wheel disc 31 is detachably bolt-secured at its inner periphery to the hub flange 32.

At its outer periphery, the wheel disc 31 is fitted with a multiplicity of circumferentially spaced radially outwardly projecting spring tines 33.

Intermediate its ends each such spring tine includes a coil 34 which projects rearwardly from the tine, i.e., contra to the direction of travel; such coils 34 being disposed adjacent but outwardly of the wheel disc 31.

At the inner end each spring tine 33 is formed with a loop 35 which lies against the face of the wheel disc 31 adjacent its outer periphery, and a cross bolt 36 secures each loop 35 to such disc. Further, each loop 35 has a free end tip 37 turned rearwardly at a right angle and passing through a hole 38 in the wheel disc 31 whereby to prevent turning of the tine about the bolt 36.

The weeding rotor 22—which always occupies a diagonal position relative to the direction of travel—may, if desired, be reversed in its diagonal relation to such line of travel. For example, when the weeding rotor 22 is in the diagonal position shown in full lines in FIG. 2, the spindle 28 extends in rearward diverging relation to the line of travel. To reset the weeding rotor 22 to a reverse diagonal, as shown in broken lines in FIG. 2, said spindle 28 is adjusted to a position extending in forward diverging relation to said line of travel.

In al working positions of the weeding rotor 22, the coils 34 must extend rearwardly from the tines 33. Hence, when the weeding rotor 22 is reversed from its full line position to the broken line position as in FIG. 2, it is necessary that the wheel disc 31 be detached from the hub flange 32 and said wheel disc then reattached the other way around. The diagonal angularity of the weeding rotor 22—in either such position—is adjusted, as working conditions may require, by suitable setting of the spindle 28.

At times it is desirable to provide the implement with a gauge wheel unit, indicated generally at 39; such unit comprising the following:

A relatively short, downwardly inclined radial arm 40 is clampingly engaged at one end, by means of a bolt 41, with the shaft 24; said arm 40 thus being disposed parallel to the longitudinal draft beam 5 and adjacent but adjustably spaced therefrom.

At its outer or free end, the radial arm 40 is fitted with a lateral spindle 42 which projects in a direction opposite said beam 5; such spindle 42 having a gauge wheel 43 journaled thereon.

When the weeding rotor 22 is set in the diagonal position show in full lines in FIG. 2, the radial arm 40 projects forwardly to dispose the gauge wheel 43 ahead of the shaft 24. However, when the weeding rotor 22 is set to a reverse diagonal position, as shown in broken lines in FIG. 2, the radial arm 40 is set to project rearwardly from shaft 24 so as to then dispose the gauge wheel 43 likewise rearwardly of said shaft 24 and out of the way of said weeding rotor 22.

In operation of the described weeding implement and by reference to the same with the parts in their full line positions of FIG. 2, the tractor 3 is guided so that the central bottom portion of the weeding rotor 22 runs directly along the crop row 44 with the tines 33 penetrating such crop row to a depth controlled by the gauge wheel unit 39.

As the tractor advances, the diagonal weeding rotor (by virtue of its ground engagement at the central bottom portion) is caused to rotate whereby the tines 33 successively and diagonally sweep through said crop row 44 to remove weeds, form a mulch, aerate the soil, and cultivate such plant row.

The gauge wheel unit 39 is particularly useful when it is desirous to use the implement to remove weeds prior to the emergence along the row of the planted seeds. In this case, the gauge wheel unit 39 is set to precisely control the depth of penetration of the tines 33 and to thus prevent them from working too close to or disturbing the planted seeds.

When the gauge wheel unit 39 is in use, it is maintained in firm ground engagement alongside the crop row 44 by virtue of the springs 19 and 20 (both disposed below the sleeve 15) yieldably urging the rod 11 and the entire draft structure 1 downwardly.

In addition to use along a crop row prior to emergence of the wanted plants, the implement is also normally used after emergence of the wanted plants but when they are deeper rooted than the weeds, yet when both are quite small. At this stage there may be some wanted plant reduction but such "thinning" may be desirable. Further, once the wanted plants are rooted securely, the implement can be used at frequent intervals to remove the small weeds as they emerge.

When precise depth control of the tines 33 is unnecessary, the gauge wheel unit 39 is detached and removed from the implement. In this event, the upper spring 20 is placed on the rod 11 above the pivotally mounted guide sleeve 15 and between the latter and the upper stop collar 21; the lower spring 19 remaining below such sleeve and between the latter and the lower stop collar 18. Both stop collars 18 and 21 are then set to place the related springs under some compression. Consequently the draft structure 1 together with the weeding rotor 22 carried thereby is spring balanced (within an adjustable range) to provide the correct pressure on the crop row 44 by the weeding rotor 22.

It may here be noted that in any setting of the diagonal angularity of the weeding rotor 22, it remains with the central bottom portion thereof directly on the crop row 44; this for the reason that the axis of adjustment, i.e., bolt 29, lies in substantially the plane of rotation of said weeding rotor.

Further, the aggressiveness of the weeding rotor 22 can be varied by rotary adjustment of the shaft 24. By adjusting said shaft 24 to set the said rotor 22 with a slight forward pitch, the aggressiveness of such rotor is increased, whereas adjustment to a rearward pitch decreases said aggressiveness.

In the normal operation of the implement, the weeding rotor 22 scratches or cultivates across the crop row 44 diagonally in one direction. However, if more extensive weeding and cultivation is desired, a two pass operation may be conducted with the weeding rotor 22 set to one diagonal position on the first pass and set to its reverse diagonal position on the second pass. The result is a crisscross weeding and cultivating action as illustrated in FIG. 2.

With the described weeding implement a crop row can be maintained substantially weed free and in excellent condition for the growth of the wanted plants.

From the foregoing description, it will be readily seen that there has been produced such a rotary weeder as substantially fulfills the objects of the invention, as set forth herein.

While this specification sets forth in detail the present and preferred construction of the rotary weeder, still in practice such deviations from such detail may be resorted to as do not form a departure from the spirit of the invention, as defined by the appended claims.

Having thus described the invention, the following is claimed as new and useful and upon which Letters Patent is desired:

1. A weeding implement comprising a draft structure which includes a longitudinally extending beam and a transverse shaft projecting from the beam adjacent one end thereof and having a free outer end; a spindle diagonal to the line of draft secured on and projecting from the free end of the transverse shaft, a weeding rotor turnable on the spindle, and means mounting the shaft for adjustable limited rotation about its axis while normally securing said shaft against rotation; such means comprising, with a bore through the beam and into which bore the shaft turnably projects, the beam having a longitudinal transverse split extending from the bore to the adjacent end of the beam, and a vertical clamping bolt mounted in the beam extending across the split and the adjacent portion of the bore; the shaft having a tangential notch substantially the width of the bolt in position to fit about the bore-projecting portion thereof and deeper than the same, whereby to allow of limited rotation only of the shaft when the bolt is loosened but not withdrawn.

2. A weeding implement comprising a draft structure adapted to be supported above-ground for movement lengthwise of a crop row, the structure including a longitudinally extending beam and a transverse shaft projecting from the beam and having a free outer end, a weeding rotor, means mounting the rotor on the outer end of the shaft in reversible diagonal relation to and in weeding engagement with said crop row, an arm projecting radially from the shaft and turnable thereon between forwardly and rearwardly projecting positions, means to releasably secure the arm against movement from one position or the other, and a transverse-axis ground-engaging gauge wheel turnably supported from the arm and disposed between the arm and the crop row.

References Cited

UNITED STATES PATENTS

| | | | |
|---|---|---|---|
| 749,906 | 1/1904 | Ryder | 172—181 |
| 1,806,376 | 5/1931 | Veselka | 172—534 X |
| 2,308,575 | 1/1943 | Vickery | 172—543 X |
| 2,482,883 | 9/1949 | Thomas | 56—400 |
| 2,655,087 | 10/1953 | Hester | 172—298 |
| 3,032,121 | 5/1962 | Carter | 172—556 X |
| 3,101,123 | 8/1963 | Schmidt | 172—49 X |
| 3,314,486 | 4/1967 | Remy | 56—377 |

FOREIGN PATENTS

| | | |
|---|---|---|
| 851,612 | 10/1960 | Great Britain. |

ABRAHAM G. STONE, *Primary Examiner.*

J. R. OAKS, *Assistant Examiner.*